US005366677A

United States Patent [19]

Mahanov

[11] Patent Number: 5,366,677

[45] Date of Patent: Nov. 22, 1994

[54] METHOD FOR PRODUCING PRESSED PRODUCTS USING WOOD OR VEGETABLE MATERIAL WITHOUT ADDING BINDING SUBSTANCES AND WITHOUT PRELIMINARY PROCESSING

[75] Inventor: Leonard V. Mahanov, Kuibysheva, Russian Federation

[73] Assignee: DCD, Ltd., Moscow, Russian Federation

[21] Appl. No.: 69,553

[22] Filed: May 28, 1993

[51] Int. Cl.$^5$ .............................................. B29C 43/00

[52] U.S. Cl. .................................... 264/113; 264/115; 264/120; 264/123; 264/126

[58] Field of Search ............... 264/109, 113, 115, 120, 264/123, 126

[56] References Cited

U.S. PATENT DOCUMENTS 4,111,744 9/1978 Reiniger ............................. 264/126
4,627,951 12/1986 Shen .................................. 264/109
5,093,051 3/1992 Reiniger ............................. 264/109

*Primary Examiner*—Allan R. Kuhns
*Attorney, Agent, or Firm*—Lieberman & Nowak

[57] ABSTRACT

Ecologically safe constructional materials, and particularly large-sized constructional structures such as wall plates can be economically produced. Wood or another vegetable material ground to the particle size of not more than $2\times10^{-3}$ m, dried to 9–11% moisture content, heated by heating the press-mold to the 200° to 220° C. temperature and adding ground material heated at least 120° C., and loaded it into the press-mold for 1 to 1.5 min. per $1\times10^{-3}$ m of produced pressed material. After that, pressing is done in a hermeticly sealed press-mold at this temperature at a pressure of not less than 30.0 MPa with exposure to this pressure for 1 to 1.5 min. per each $1\times10^{-3}$ m of produced pressed material followed by cooling of press-mold without depressurization at full pressure.

9 Claims, 1 Drawing Sheet

METHOD FOR PRODUCING PRESSED PRODUCTS USING WOOD OR VEGETABLE MATERIAL WITHOUT ADDING BINDING SUBSTANCES AND WITHOUT PRELIMINARY PROCESSING

The invention refers to production of environmentally clean large-sized constructional materials such as wall plates, as well as to production of furniture parts, sawn timber and other moldable materials by the way of piezometric treatment of pressed material from wood and other vegetable stuffS, comprising hemicellulose, lignin, cellulose, without adding to it adhesive agents and its pre-treatment.

Well-known is the method of making bricks, constructional plates and other similar products from vegetable fibres and wood by pressing under high pressure of up to 50 MPa at an elevated temperature of up to 300° C., which is enough for its transformation into a meltable mass. The pressed material is kept in a closed mold without air access. Evaporation and gases are released during 3-70 minutes. The material is cooled to the ambient temperature to receive parts pressed as one-piece. (USSR Author's Certificate N 38070, Cl. B27N 3/02, published 1934).

However, because of complicated technology and low quality of one-piece pressed products (formation of bubbles, cracks, underpressing and so on), this method is not in common use. Moreover, it is not suitable for production of large-sized constructional structures.

Also known is a method of pressed article production known as the "lignoplast method" in which a vegetable material undergoes treatment in a hermetic press-mold at 125°-210° C. temperature and 5.0-30.0 MPa pressure. Thereafter, the moldable part is cooled to 50° C., pressure is reduced, the press-mold is released and a molded part is taken out. (FRG Patent No. 841055, published in 1985).

Against the given method parts of small sizes are produced, for example, seats for closet basins. This method was found to be unsuitable for the production of large-sized constructional structures, because the issues were not elaborated concerning homogeneous heating and cooling of multiple tons of ground vegetable material and its homogeneous pressing in hermetic press-molds.

A method of transforming lignocellulose materials into composite products such as constructional plates, furniture parts, sawn timber and moldable articles without adding polymer adhesive agents by the way of degradation and hydrolysis by steam at 120°-260° C. in hemicellulose portion of lignocellulose material under pressure to liberate tree sugar, furfural and other products of degradation, which under pressure and heating are chemically transformed into a polymer substance which acts as a thermoactive adhesive agent is also known. (EP Application N 0161766, Cl. B17N3/04, published in 1948).

This method cannot be used for production of large-sized constructional structures because of the uneven heating and cooling of large masses of source material and the continuous imposing and releasing of pressure from the press-mold which is stuffed with material to be pressed. In this case, the technological process includes an additional procedure of preliminary hydrolysis by overheated steam that complicates pressed article production method.

Another known method of pressed article production from wood or another vegetable material with no adhesive agent added to it and no preliminary treatment, includes grinding wood and another vegetable material until the particle size gets to be not more than $2\times10^{31\ 3}$ m, drying of ground material to 9-11% moisture content, heating of ground and dried material to the 200°-220° C. temperature under pressure not less than 30.0 MPa and exposing of this pressure during 1-1.5 min. per $1\times10^{31\ 3}$ m thickness of the material being pressed, followed by cooling of press-mold under hermetic, full pressure conditions, releasing pressure during 3 min. and removing the pressed material from the press mold. (Minin A.Kh. Piezothermoplastic Technology, M., Lesnaya Promyshlennost, 1966, pp. 195-199).

This method, yields pressed articles of small size; 0.15×0.15 m floor plates and parquetry staves, because the method was not thoroughly developed to produce even active cooling of press-molds (and, consequently, of press-material). Questions of imparting and releasing pressure, particularly the rate of these processes was not developed, therefore in the production of articles by the way of imposing pressure on them and releasing pressure from them, micro-explosions take place in the body of the ground press-material, which reduce the strength of material in separate areas, resulting in production of low quality, unstable pressed articles. This is particularly apparent in large-sized articles because even cooling of large masses of ground press-material is impossible, insufficient exposure is obtained under pressure, and as a consequence, these processes are not carried out under optimal conditions. Insufficient tackling of problems of imposing and releasing pressure from press-molds was also the reason for the physical and chemical processes in ground press-material which were not progressing under those optimal conditions required for producing pressed articles of good quality with homogeneous whole volumes.

To implement the well-known method of pressed article production, it is necessary to use power and material consuming equipment for pressing articles of large overall sizes. Heavy pressing machines are required to achieve the large operational load of about 2,500 tons, a large displacement of the movable load-bearing cross-yoke which are driven from powerful power plants (motors of 1500 kWt).

An object of the present invention is to produce large-sized constructional structures with homogenous and stable physical and technical parameters, using decreased power and material consumption.

The objective is accomplished by a method of pressed article production from wood or another vegetable material without preliminary adding to it of adhesive materials and pre-treating, including drying of wood or another vegetable material whose particles are ground to the size of not more than $2\times10^{31\ 3}$, to the moisture content of 9-11%, heating of ground and dried material to 200°-220° and its pressing in hermetic press-molds under a pressure of not less than 30.0 MPa, with exposure under this pressure during 1-1.5 min. per $1\times10^{-3}$ m of thickness of the produced press-material, followed by cooling of press-molds done without depressurization and under full pressure, by pressure release during not less than 3 min. and removing the pressed material from the press-mold. Unlike previous methods, ground material heating is done by heating a press mold to about 200°-220° C. and charging it with the pre-heated to not less than 120° C. ground material with exposure during 1-1.5 min. per $1\times10^{-3}$ m of pressed material being produced, therein the rate at which pressure is released is kept the same as the rate of pressure increase while pressing and press-molds cooling is performed without depressurization at full pressure by the way of active cooling to 50°-60° C. After pressure release with simultaneous active cooling to 30°-40° C., and further cooling in air to ambient temperature, the pressed material is taken out of the press-mold.

Active cooling of the press-mold is realized first by feeding compressed air and then water simultaneously with air and water spray in the air stream.

Ground material drying is realized first in a cyclone drier to 30% moisture content and then in a drum drier to 60% moisture content. After that, the material is humidified to the required humidity of 9-11%.

Before pressing, the ground humidified material in press-molds is subjected to consolidation. Pressing is done to 20.0-25.0 MPa with hydraulic press load-bearing cross-yoke moving quickly, and then to the required pressure by slow movement of the load-bearing cross-yoke.

Alternatively, rotten sawdust, particularly birch-tree sawdust, as wood or other vegetable material, or as an additive to this material, may be used.

Before pressing in the press-molds, a layer of mineral crumb is poured onto the ground material.

Granite crumb may be poured into press-molds as a mineral crumb.

In the process of piezometric treatment of the press-material from various wood and other vegetable materials containing hemicellulose, lignin, cellulose, linking (bonding) agents are formed in it, which during the process of piezothermic attack in a closed space distribute themselves in the aggregation left in the press-mold with setting being followed. As an organic press-material is being piezothermally processed in a closed space complex, physical and chemical processes are proceeding which determine the quality of produced pressed material, i.e. of plastic. In piezothermal processing organic press-material, the hermetic press-mold functions as a press-mold. When the press-material is compacted, the press-mold functions as a hydrolysis apparatus where the press-material is subjected to hydrolysis, as a retort where the press-material is subjected to pyrolysis, as a reactor where synthetic resins and other bonding agents are formed from products of press material pyrolysis and hydrolysis, as a mixer where the bonding agents formed in the press-material under the influence of high temperature and high pressure distribute in the left filling agent and again as a press-mold where the press-material acquires its final shape. In spite of the overall difficulty, the entire physical and chemical process of piezothermoplastic production is performed in one operational cycle. All phases of this proceeding are in a hermetically closed press-mold with no release of gases and evaporates harmful to humans. The process of pressing an article is ecologically clean since the bonding agents used are not harmful to humans. During production, humans do not come in contact with the components formed in the closed press-mold. Physical and chemical processes in the press-material proceed in parallel, or one process predominates over another depending on the source state of the press-material (its humidity, grade of grinding, wood species and so on), piezothermal processing conditions (pressure, temperature, exposure time, process hermetization level, cooling and pressure release rates).

Distinguishing features of the claimed method require that heating of ground material is done through heating of press-molds to 200°-220° C. and loading in them of the ground material heated to not less than 120° C. with the exposure time of 1-1.5 min. per $1\times10^{-3}$ m of produced press-material which permits homogeneous heating of all the bulk of ground material that is required in production of large-overall-size constructional structures (e.g. $3\times2.6\times0.15$ m size). As a result, the heating process proceeds very quickly, for only 1-1.5 min. per each $1\times10^{31\ 3}$ m of press-material being produced. As experiments show, this is enough time for even heating all of the material. Ground material heated to the temperature lower than 120° C. is not permitted because loading of such a material into press-molds, pre-heated to the 200°-220° C. temperature, leads to cooling of press-molds filled up with material to temperatures lower than those required by technology, that is lower than 200° C. and, consequently, to conduct pressing process not on optimal temperature conditions. Besides, heating done in this way allows reduction of heating time and, as a consequence, reduction of power consumption to obtain required temperature conditions.

Pressure release from press-molds done after pressing at the rate equal to the rate of pressure increase in the process of pressing, as well as active cooling of the press-mold to the 50°-60° C. temperature under the full pressure with no depressurization, precludes formation of micro-explosions in the press-material bulk when physical and chemical transfigurations take place in the process of pressing and, particularly, in the processing of press-mold releasing from pressure that might result in production of constructional structures of bad quality unstable and uneven properties. Lack of this phenomenon yields structures with physical and chemical parameters even throughout the space (in the volume and over the area) and stable against the time.

Further active cooling of press-molds with material to the 30°-40° C. temperature with simultaneous pressure release allows physical and chemical processes in the press-material whole volume to achieve their finish and subsequent air cooling to the ambient temperature (passive cooling) with no pressure provides the possibility for gases and evaporations produced in the course of pressing and thermal attack on the press-material to be liberated from produced press-material.

Active cooling, first by feeding compressed air and then simultaneously with air, of water and water spraying in the air stream, prevents the development of pneumohydraulic impact of steam and through that the plugging of all the channels of the press-mold and impossibility to implement cooling and besides allows even cooling of press-molds and, consequently, of press-material throughout the whole volume to be done, that ensures that physical and chemical processes can proceed uniformly in the material and as a result press-material of higher quality can be produced, with more homogeneous properties.

Drying of ground material to 30% moisture content, first in cyclone driers and then to 6% moisture content in drum driers, followed by humidification to the required 9-11% moisture content reduces considerable power consumption and drying time because there is no necessity in complicated procedures to keep specified conditions related with the humidity of the source material that considerably simplifies the drying process and allow the use of simpler equipment.

Preliminary material compaction in press-molds and two-stage pressing, first to 20.0–25.9 MPa with fast displacement of load-bearing cross-yoke of the pressing machine, and then to the required pressure with slow displacement of the cross-yoke allows to reduce considerably time period for pressing process because during this process the compaction of the source material is realized to different extents: in its first stage a small compaction (under the greatest displacement) at minor pressure takes place, then higher and higher pressures are required for the compaction to take place at insignificant movements, that in its turn allows to use equipment for lower metal content with lower power consumption.

Use of rotten sawdust, particularly of birch-tree sawdust as wood or another vegetable material provides the possibility to increase the strength of the produced pressed material, i.e. of constructional structures.

Pouring of a mineral crumb layer, for example of granite crumb, into press-molds on a layer of ground wood or other vegetable material, permits production constructional structures with improved surface qualities. For example, to produce a wall plate with granite facing of the side-wall surface. In this way, one can produce article surfaces with any specified characteristics: predetermined color, finish, hardness and high-temperature strength, and so on.

Thus, the subject method allows production of large-overall-sized constructional structures with homogeneous and stable physical and chemical properties which considerably reduce power consumption and equipment metal content.

Thus, structures made against the patented method from natural raw waste lumber of deciduous species of wood without adding of bonding agents and without pretreatment, had the following physical and chemical indices, which were homogeneous for the entire volume and density, t/m$^3$—1.32, static flexural strength—29.5 MPa, compression ultimate strength—124.0 MPa, impact elasticity—6.7 kgf/sm$^2$, hardness number—3.05 MPa, fluid loss during 24 h—5.5% that are considerably higher than indices for the articles made by earlier methods.

Testings of pressed articles made by the subject process showed that physical and technical characteristics of produced plates are preserved even after exploitation of these plates in most severe environmental conditions, e.g. for over three years these plates served without modification as floor plating in cowhouses, while the floors made from the material produced by known methods, became unfit for use.

Power consumption and equipment size are considerably reduced. For example, instead of electric motor of 1500 kW power, it is required an electric motor of only 90–125 kW power to drive the hydraulic pressing machine of 25 thousand tons load, and thereby the weight of the pressing machine is reduced ten times.

The description is given below of the technological process of pressed article production from large-sized wood or another vegetable material, the diagram of which is given in the figure.

DETAILED DESCRIPTION OF THE INVENTION

Figure 1:
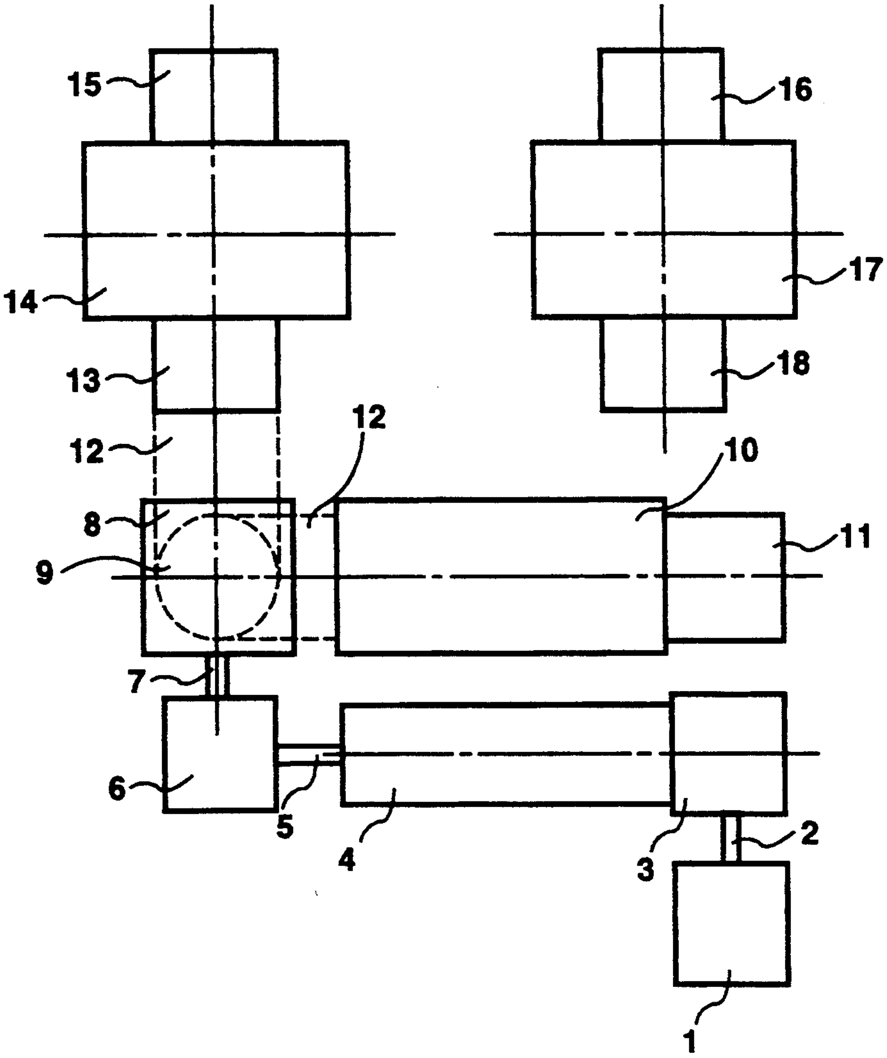
FIG. 1 shows a schematic overview of the subject method.

The raw material supplied to the shop for article production from ground wood may have different size, quality and humidity.

The wood or another vegetable raw material, for instance, large-sized wastes are fed into crushers 1 where it is converted into chips during primary crushings and into fine crumb during secondary crushing. When production of pressed articles is organized from chips left after machine tooling, then only the secondary crushing is required, and when from sawdust, wood dust and other fine wastes, neither the primary nor the secondary crushing is required. The crushed material is directed to be graded in order to remove coarse wood particles, which are sent for secondary crushing, but the major mass of the conditioned crushed material is conveyed by pneumatic transport 2 for drying. Ground material drying is done first in cyclone driers 3 till 30% moisture content and then in drum driers 4 until 6% moisture content, thereafter the material is humidified until it acquires 9–11% moisture content and when it is necessary it is directed for the final grinding to the millers 6 by pneumatic transport 5, where it is grinded until the required granular size that is of not more than $2\times10^{-3}$ m. Thereafter, it is taken by pneumatic transport to a collecting hopper 8. If the dry material does not need to be ground then it is fed to the collecting-hopper-meter 8. In this hopper, the dried, ground wood or another vegetable material is collected, therein a heating system is provided in the hopper the material not to be cooled to the temperature lower than 120° C. By transportation mechanism 11, the press-mold is preheated in the furnace 10 to 200°–220° C. temperature is fed to the collecting hopper 8 with the help of movable and rotationable table 9. The prepared press-material is uniformly charged from the collecting hopper 8 into press molds with the help of the serving meter of continuous or periodical operation, therewith it is necessary to level off the press-material over the press-mold area, otherwise the pressed article will not be homogeneous because the flowability of the material is relatively low. The press-mold charged with material is exposed for 1–15 min. per $1\times10^{-3}$ m of produced press-material thickness and over the roller conveyer 12 is delivered onto the charge area 13 and under the press-machine 14 for preliminary pressing, where the press-material is subjected to preliminary compaction to reduce the press-mold height of the press-mold charged with press-material. In order to increase the efficiency of preliminary pressing, one press-mold is placed onto the other one as a stack of about 1.5 m overall height and feed this stack into the machine for preliminary pressing. Thereafter, the press-molds were preliminary compacted. Press-material is delivered from reloading area 15 of the preliminary pressing machine onto the charge area 16 of the technological pressing machine 17, therewith press-molds are put on each other and are assembled as a stack of twelve press-molds in each stack, that considerably increases the efficiency of the entire pressing process. Press-molds having such a configuration are placed into the technological pressing machine.

First, pressing is done to 20.0–25.0 MPa at fast movement of the load-bearing press-yoke of the hydraulic pressing machine, and then to the required pressure of not less than 30.0 MPa with exposure to the pressure during 1-15 min per $1\times10^{-3}$ m of produced pressed material thickness.

Such an imparting of load to press-molds made in two steps permit to considerably accelerate the pressing process. After exposure of press-molds under complete pressure they start to cool them until 60° C. without depressurization and pressure release and then simultaneously with cooling till 40° C. they realize the pressure release from the press-mold, therewith pressure release rate is kept equal to pressure increase rate while pressing. Press-molds cooling till 60° C. and 40° C. is done by feeding first of compressed air onto the press-molds and then simultaneously with this of water which is sprayed in the air stream, for that aim the water is fed to the middle portion of the air stream. After press-molds cooling till 40° C., and complete pressure release the press-molds are delivered to the unloading area 18 of pressing machine 17, where they are cooled to the ambient temperature. After that, the stacks are unloaded, press-molds parted and produced pressed articles released from the press-molds. Thereafter, ready-made pressed articles, for example wall panels, may be delivered for further processing or directly to a customer. Upon custom's demand, the pressed-articles surface may be faced by any well-known material, for example, may be finished with granite facing or a fire-proof facing. For this aim upon the upper layer they pour granite crumb or another specified material which is securely pressed into the source wood material in the course of pressing process.

The subject invention has been described in terms of its preferred embodiments, other variations will become obvious upon reading this disclosure. These variations are to be considered within the scope and spirit of the subject invention which is only to be limited by the claims which followed and their equivalents.

What is claimed is:

1. A method for the fabrication of pressed articles from wood or another vegetable material in the absence of bonding agents which comprises the steps of (a) drying wood or other vegetable material which has been ground to a particle size of less than $2\times10^{31}$ $^{3}$ m to a moisture content ranging from 9-11%;

(b) heating hermetically sealed first press molds to a temperature within the range of 200°-220° C. and pressing the ground dried material which has been heated to a temperature not less than 120° C. in heated second press molds under a pressure of not less than 30.0 MPa for a time period ranging from 1 to 1.5 min per $1\times10^{-3}$ m of resultant pressed material thickness;

(c) cooling the first press molds under full pressure without depressurization and gradually releasing the pressure; and (d) removing the pressed material from said first press molds.

2. Method in accordance with claim 1 wherein the rate of pressure release during cooling is equal to the rate of pressure increase during pressing and cooling of the first press molds until complete depressurization occurs at a temperature within the range of 50°-60° C. at which point cooling is continued until ambient temperature is reached and the pressed material removed from said first press molds.

3. Method in accordance with claim 1 wherein cooling of said first press molds is initially effected with compressed air and subsequently with water sprayed into the air.

4. Method in accordance with claim 1 further comprising drying the ground material in a cyclone drier to a moisture content of 6% and, subsequently, humidifying said material to attain a moisture content within the range of 9-11%.

5. Method in accordance with claim 1, wherein prior to pressing the ground material in first press molds, preliminary pressing at 20.0-25.0 MPa is effected by fast displacement of a load-bearing cross-yoke in a hydraulic pressing machine.

6. A method of claim 1, wherein rotten sawdust is used as the wood or another vegetable material, or as an additive to this material.

7. A method of claim 6, wherein the rotten sawdust is birch tree sawdust.

8. A method of claim 1 further comprising pouring a mineral crumb layer onto the ground material prior to pressing.

9. A method of claim 8, wherein the mineral crumb comprises granite.

* * * * *